US009237225B2

(12) United States Patent
Garcia et al.

(10) Patent No.: US 9,237,225 B2
(45) Date of Patent: Jan. 12, 2016

(54) APPARATUS WITH DYNAMIC AUDIO SIGNAL PRE-CONDITIONING AND METHODS THEREFOR

(71) Applicant: Google Technology Holdings LLC, Mountain View, CA (US)

(72) Inventors: Juan C Garcia, Grayslake, IL (US); Joel A Clark, Woodridge, IL (US); Tenkasi V Ramabadran, Oswego, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 13/955,198

(22) Filed: Jul. 31, 2013

(65) Prior Publication Data
US 2014/0270150 A1 Sep. 18, 2014

Related U.S. Application Data

(60) Provisional application No. 61/844,989, filed on Jul. 11, 2013, provisional application No. 61/776,793, filed on Mar. 12, 2013, provisional application No. 61/798,097, filed on Mar. 15, 2013.

(51) Int. Cl.
*G10L 21/14* (2013.01)
*G10L 21/0208* (2013.01)
(Continued)

(52) U.S. Cl.
CPC ............... *H04M 3/002* (2013.01); *G10L 21/02* (2013.01); *H04M 9/082* (2013.01); *G10L 21/0208* (2013.01); *G10L 25/48* (2013.01); *G10L 2021/02082* (2013.01); *H04B 3/234* (2013.01)

(58) Field of Classification Search
None
See application file for complete search history.

(56) References Cited

U.S. PATENT DOCUMENTS 6,778,959 B1   8/2004  Wu et al.
6,839,670 B1   1/2005  Stammler et al.
(Continued)

FOREIGN PATENT DOCUMENTS

CN   101517550   8/2009
EP     1404147   3/2004
(Continued)

OTHER PUBLICATIONS

International Search Report and Written Opinion for International Application No. PCT/US2011/029407, mailed Jun. 7, 2011, 10 pages.
(Continued)

*Primary Examiner* — Fan Tsang
*Assistant Examiner* — Jeffrey Lytle
(74) *Attorney, Agent, or Firm* — Fish & Richardson P.C.

(57) ABSTRACT

An apparatus includes an echo canceller having an audio signal input and an audio signal output and dynamic pre-conditioning logic. The dynamic pre-conditioning logic is operatively coupled to the echo canceller audio signal output as a feedback signal and has a dynamic pre-conditioning logic output operatively coupled to the echo canceller audio signal input. The dynamic pre-conditioning logic is also operative to receive an audio signal input from at least one microphone. The dynamic pre-conditioning logic is operative to analyze the feedback signal to obtain at least one characteristic, and pre-condition the audio signal input, based on the at least one characteristic of the feedback signal, and provide a pre-conditioned audio signal at the echo canceller audio signal input. The echo canceller audio signal output is then provided to a noise suppressor for the send path of a full duplex communication channel.

20 Claims, 5 Drawing Sheets

(51) Int. Cl.
*H04M 3/00* (2006.01)
*G10L 21/02* (2013.01)
*H04M 9/08* (2006.01)
G10L 25/48 (2013.01)
H04B 3/23 (2006.01)

(56) References Cited

U.S. PATENT DOCUMENTS

| | | |
|---|---|---|
| 6,876,966 B1 | 4/2005 | Deng et al. |
| 6,950,796 B2 | 9/2005 | Ma et al. |
| 6,959,276 B2 | 10/2005 | Droppo et al. |
| 7,257,532 B2 | 8/2007 | Toyama |
| 7,392,188 B2 | 6/2008 | Junkawitsch et al. |
| 7,424,426 B2 | 9/2008 | Furui et al. |
| 7,451,085 B2 | 11/2008 | Rose et al. |
| 7,941,189 B2 | 5/2011 | Miyauchi |
| 7,996,220 B2 | 8/2011 | Rose et al. |
| 8,175,872 B2 | 5/2012 | Kristjansson et al. |
| 8,219,384 B2 | 7/2012 | Lloyd et al. |
| 8,265,928 B2 | 9/2012 | Kristjansson et al. |
| 8,428,940 B2 | 4/2013 | Kristjansson et al. |
| 8,682,659 B2 | 3/2014 | Kristjansson et al. |
| 2003/0236099 A1 | 12/2003 | Deisher |
| 2004/0138882 A1 | 7/2004 | Miyazawa |
| 2004/0230420 A1 | 11/2004 | Kadambe et al. |
| 2005/0187763 A1 | 8/2005 | Arun |
| 2005/0216273 A1 | 9/2005 | Reding et al. |
| 2005/0243994 A1* | 11/2005 | Rayala .................... 379/406.01 |
| 2007/0255560 A1* | 11/2007 | Rahbar ........................ 704/226 |
| 2008/0027723 A1 | 1/2008 | Reding et al. |
| 2008/0091435 A1 | 4/2008 | Strope et al. |
| 2008/0091443 A1 | 4/2008 | Strope et al. |
| 2008/0188271 A1 | 8/2008 | Miyauchi |
| 2008/0221887 A1 | 9/2008 | Rose et al. |
| 2009/0030687 A1 | 1/2009 | Cerra |
| 2009/0271188 A1 | 10/2009 | Agapi et al. |
| 2009/0299742 A1* | 12/2009 | Toman et al. ................ 704/233 |
| 2010/0081487 A1 | 4/2010 | Chen et al. |
| 2010/0223054 A1 | 9/2010 | Nemer et al. |
| 2011/0137653 A1 | 6/2011 | Ljolje et al. |

FOREIGN PATENT DOCUMENTS

| | | |
|---|---|---|
| WO | 2011/149837 | 12/2011 |
| WO | 2012091643 A1 | 7/2012 |

OTHER PUBLICATIONS

Bocchieri et al., "Use of geographical meta-data in ASR language and acoustic models", Acoustics Speech and Signal Processing (ICASSP), 2010 IEEE International Conference on IEEE, Mar. 14, 2010, pp. 5118-5121.
International Search Report from related PCT Application No. PCT/US2011/037558, dated Jul. 29, 2011.
International Preliminary Report and Written Opinion from related PCT Application No. PCT/US2011/029407, dated Oct. 26, 2012, 6 pages.
Australian Office Action in Application No. 2011241065, date of issue Dec. 17, 2013, 3 pages.
Chinese Office Action in Application No. 201180019038.8, dated Dec. 19, 2013, 7 pages (English translation).
Mossi et al., "Robust and low-cost cascaded non-linear acoustic echo cancellation," Acoustics, Speech and Signal Processing (ICASSP), 2011 IEEE International Conference on, May 22, 2011, pp. 89-92.
Mossi et al., "Dual amplifier and loudspeaker compensation using fast convergent and cascaded approaches to non-linear acoustic echo cancellation," 2012 IEEE International Conference on Acoustics, Speech and Signal Processing (ICASSP 2012), Mar. 25, 2012, pp. 41-44.
International Search Report and Written Opinion for International Application No. PCT/US2014/016356, mailed May 2, 2014, 9 pages.
International Preliminary Report on Patentability for International Application No. PCT/US2014/016356, mailed Sep. 24, 2015, 7 pages.

* cited by examiner

APPARATUS WITH DYNAMIC AUDIO SIGNAL PRE-CONDITIONING AND METHODS THEREFOR

CROSS-REFERENCE TO RELATED APPLICATIONS

The present patent application claims priority to U.S. Provisional Patent Application No. 61/844,989, filed Jul. 11, 2013, entitled "APPARATUS WITH DYNAMIC AUDIO SIGNAL PRE-CONDITIONING AND METHODS THEREFOR," and further claims priority to U.S. Provisional Patent Application No. 61/798,097, filed Mar. 15, 2013, entitled "VOICE RECOGNITION FOR A MOBILE DEVICE," and further claims priority to U.S. Provisional Pat. App. No. 61/776,793, filed Mar. 12, 2013, entitled "VOICE RECOGNITION FOR A MOBILE DEVICE," all of which are assigned to the same assignee as the present patent application, and all of which are hereby incorporated by reference herein in their entirety.

FIELD OF THE DISCLOSURE

The present disclosure relates generally to audio processing and more particularly to methods and apparatuses for audio filtering and noise suppression in audio processing systems.

BACKGROUND

Communication devices such as, but not limited to, stationary telephones, cordless telephones, mobile phones, smart phones, tablets, laptops, etc., include, or may include, audio processing for voice communications, or to drive voice recognition systems to provide hands free voice control of the devices. Such communication devices employ mechanisms to cancel or reduce near field ambient noise in order to sustain a level of clarity during two-way voice (i.e. full duplex) communications. Most systems employ noise suppressors as one mechanism to stop, minimize or subtract unintended audio signals from contaminating desired speech signals during voice communications.

Most of such systems also utilize pre-conditioning processing which is applied prior to the application of more sophisticated noise suppression. For example, high pass filtering may help block or reduce wind noise or road noise. More generally, the pre-conditioning processing may include various filters or amplifiers that may be applied to one or more microphone signal outputs prior to noise suppression. This pre-conditioning however is fixed and treats all signals in the same manner. However, because input signal characteristics are dynamic and change with external conditions, including orientation of the device, the fixed pre-conditioning may not be appropriate for the given signal characteristics. Therefore, in some situations, the pre-conditioning may adversely impact subsequent noise suppression if the audio signal input to the noise suppression is inappropriately filtered or amplified.

DETAILED DESCRIPTION

Figure 1:
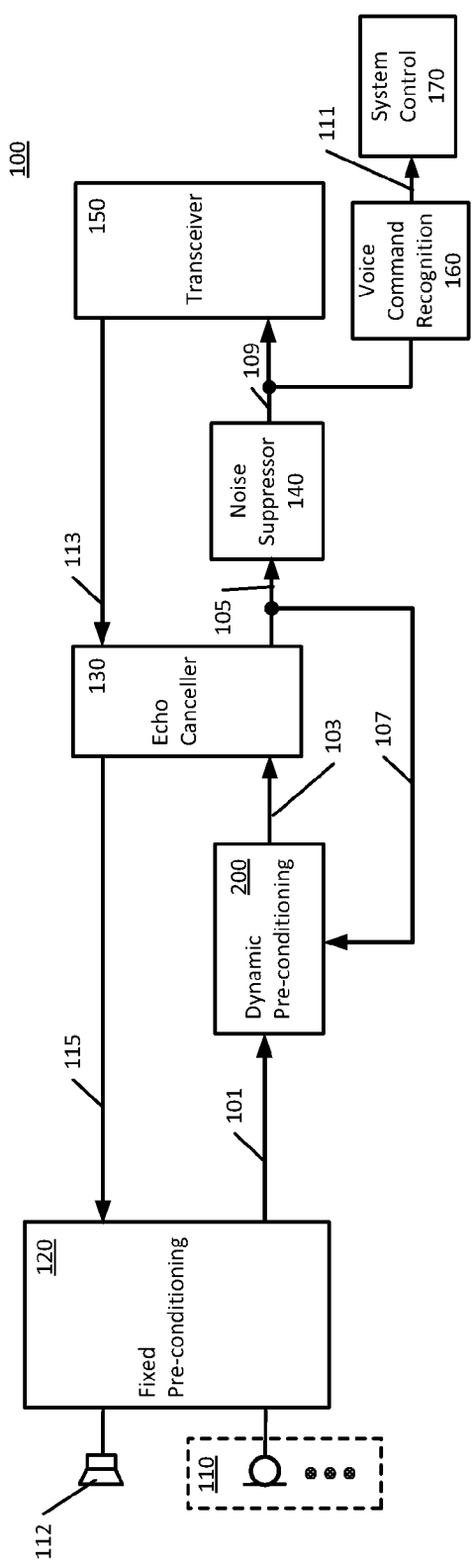
FIG. 1 is a schematic block diagram of an apparatus with dynamic audio signal pre-conditioning logic in accordance with the embodiments.

The disclosed embodiments provide a method that includes receiving an echo canceller audio signal output as a feedback signal, analyzing the feedback signal to obtain at least one characteristic, and pre-conditioning an audio signal, based on the at least one characteristic of the feedback signal, and providing a pre-conditioned audio signal as an echo canceller audio signal input. The method may include providing a pre-conditioned echo canceller audio signal output, based on the pre-conditioning audio signal, as a noise suppressor input, and performing noise suppression on the noise suppressor input. In some embodiments obtaining at least one characteristic includes obtaining at least one of a frequency characteristic or an amplitude characteristic of the feedback signal. In one embodiment, analyzing the feedback signal includes performing a Fast Fourier Transform (FFT) on the feedback signal.

In some embodiments, the method may include providing a noise suppressor output on a "send" path of a full duplex communication channel to a transceiver for transmission on the full duplex communication channel. The method may also include disabling fixed pre-conditioner filtering, prior to pre-conditioning the audio signal.

In some embodiments, the method may include determining if noise contained in the feedback signal is below a cutoff frequency as the at least one characteristic of the feedback signal and pre-conditioning the audio signal by applying a high pass filter. The method may also include determining if a near talker's voice contained in the feedback signal is within a given frequency range as the at least one characteristic of the feedback signal, and pre-conditioning the audio signal by applying a pre-emphasis filter to emphasize the given frequency range. For example, a male or female voice may have a frequency within a given frequency range which, if determined by the method, can be emphasized with an appropriate pre-determined filter.

The method may also include determining if frequency response modification is needed based on the feedback signal as the at least one characteristic of the feedback signal, and pre-conditioning the audio signal by applying a frequency modification filter. In some embodiments the method may include determining processing time available to perform filtering of the audio signal, and selecting audio signal filters based on the processing time available.

The present disclosure also provides an apparatus that is operative to perform the various disclosed methods. In one embodiment, an apparatus includes an echo canceller having an audio signal input and an audio signal output, and dynamic pre-conditioning logic, operatively coupled to the echo canceller audio signal output as a feedback signal and having a dynamic pre-conditioning logic output operatively coupled to the echo canceller audio signal input. The dynamic pre-conditioning logic is also operative to receive an audio signal input from at least one microphone.

The dynamic pre-conditioning logic is operative to analyze the feedback signal to obtain at least one characteristic, and pre-condition the audio signal input, based on the at least one characteristic of the feedback signal, and provide a pre-conditioned audio signal at the echo canceller audio signal input. The apparatus may further include a noise suppressor, having a noise suppressor input operatively coupled to the echo canceller audio signal output and having a noise suppressor output.

In some embodiments, the dynamic pre-conditioning logic may include configurable filter logic, at least one amplifier, and a filter and gain selector, operatively coupled to the configurable filter logic and to the at least one amplifier. The filter and gain selector is also operatively coupled to the echo canceller audio signal output to receive the feedback signal, and is operative to obtain at least one characteristic by obtaining at least one of a frequency characteristic or an amplitude characteristic of the feedback signal.

In some embodiments, the filter and gain selector may be operative to analyze the feedback signal by performing frequency domain analysis on the feedback signal such as, but not limited to, an FFT. In some embodiments, the configurable filter logic may be configurable to provide at least one of a high pass filter, a band pass filter or a pre-emphasis filter to emphasize the given frequency range.

In some embodiments, the apparatus may include a fixed pre-conditioner including fixed filter logic, operatively coupled to at least one microphone, and operatively coupled to the dynamic pre-conditioning logic to provide the audio signal input from the at least one microphone. The fixed pre-conditioner may have an enable and disable input to enable or disable the fixed filter logic.

Another disclosed method of operation includes receiving an echo canceller audio signal output as a feedback signal, analyzing the feedback signal to obtain at least one characteristic, selecting at least one filter from a plurality of selectable filters, based on the at least one characteristic, applying the at least one filter to filter an audio signal and obtain a filtered audio signal and providing the filtered audio signal as an echo canceller audio signal input.

In some embodiments, the method may include performing a table lookup to obtain filter coefficients for the at least one filter where the table lookup is based on the at least one characteristic. The method may then include applying the at least one filter using the filter coefficients to filter the audio signal and obtain the filtered audio signal. The method may analyze the feedback signal to obtain at least one characteristic by performing frequency domain analysis on the feedback signal.

Turning now to the drawings, FIG. 1 is a schematic block diagram of an apparatus 100 with dynamic pre-conditioning logic 200 in accordance with the embodiments. In accordance with the embodiments, the apparatus 100 may be any of various communication devices such as, but not limited to, a stationary telephone, cordless telephone, mobile phone, smart phone, tablet, laptop, etc., that may include, audio processing for voice communications, or to drive voice recognition systems to provide hands free voice control of the device. For example, the apparatus 100 may include voice command recognition logic 160 which provides a control signal 111 to a system control 170. The system control 170 may be any suitable system control and may control features or functions of the apparatus 100 or may control features or functions of one or more software or firmware applications that run on the apparatus 100, etc.

The apparatus 100 includes fixed pre-conditioning logic 120, which is operatively coupled to one or more microphones 110 and to a speaker 112. The fixed preconditioning logic 120 may include analog-to-digital converters (ADC), digital-to-analog converters (DAC), fixed predetermined audio filters and fixed predetermined amplifiers having predetermined gain levels based on assumptions made about the audio signals received by the one or more microphones 110. The fixed pre-conditioning logic 120 is operatively coupled along a send path of a full duplex communication channel, to provide at least one audio output signal 101 to the dynamic pre-conditioning logic 200. The dynamic pre-conditioning logic 200 is operatively coupled to an echo canceller 130 to provide a pre-conditioned audio signal as an echo canceller audio signal input 103. The dynamic pre-conditioning logic 200 is also operatively coupled to the echo canceller 130 to receive the echo canceller audio signal output 105 as a feedback signal 107. The echo canceller 130 is operatively coupled to a noise suppressor 140 and provides the echo canceller audio signal output 105 as a noise suppressor input. The noise suppressor 140, in turn, is operatively coupled to a transceiver 150 to provide a noise suppressor audio signal output 109 as a transceiver 150 for the full duplex communication channel send path. It is to be understood that other intervening post processing logic components may exist between the noise suppressor 140 and the transceiver 150 such as gain, more filtering, etc., however such components are not shown for the purpose of clarity. The transceiver 150 may be a wireline transceiver or may be a wireless transceiver in accordance with the various embodiments. The transceiver 150 may also operate in a Voice Over Internet Protocol (VoIP) system in some embodiments and may provide IP packet voice over a wireline or wireless VoIP connection.

The noise suppressor 140 may also be operatively coupled to the voice command recognition logic 160. As mentioned above, the voice command recognition logic 160 is operatively coupled to the system control 170, and provides a control signal 111 to control various functions or features of the apparatus 100 or to control functions and features of applications running on the apparatus 100 as appropriate. The full duplex communication channel also includes a receive path which begins with received voice, which is provided to the echo canceller 130 from the transceiver 150 as received audio signal 113. It is to be understood that some signal processing logic components may also be present between the transceiver 150 and the echo canceller 130, however such components are now shown for the purpose of clarity. The echo canceller 130 monitors the received voice and makes adjustments prior to sending an echo canceller audio output signal 115 to the fixed pre-conditioning logic 120. The fixed preconditioning logic 120 further provides an audio signal through a DAC to the speaker 112.

The apparatus 100 send path of the full duplex communication channel includes the audio signal 101 from the fixed pre-conditioning logic 120 which is processed by the dynamic pre-conditioning logic 200 to provide the pre-conditioned audio signal to the echo canceller 130. The send path continues with the echo canceller audio signal output 105 which is provided to the noise suppressor 140, and the noise suppressor output audio signal 109 which is provided to the transceiver 150 for transmission on the full duplex communication channel. The apparatus 100 receive path of the full duplex communication channel includes the received voice, which is provided to the echo canceller 130 from transceiver 150 as received audio signal 113, and includes the echo canceller audio output signal 115 which is provided to the fixed preconditioning logic 120 for provision of audio to the speaker 112.

Therefore, in the example of FIG. 1, the apparatus 100 is operative to implement a full duplex communication channel for two-way voice communication. One or more microphones 110 receive audio, such as the user's voice, for transmission on the "send" path of the full duplex communication channel, and the speaker 112 provides sound received on the "receive" path of the full duplex communication channel for two-way telephonic voice communications. Because sound emanating from the speaker 112 may be received by the one or more microphones 110 and create interference and echoes between the send and receive paths, an echo canceller 130 is employed. The echo canceller 130 operates to monitor audio on the send path, determine if any part of the send path audio shows up on the receive path, and reduce or block undesirable audio from the send path accordingly. Noise suppression is also applied to the echo canceller audio signal output 105 by the noise suppressor 140 to further reduce effects caused by stationary or non-stationary noise sources that may contaminate the voice signal. The noise suppressor 140 provides noise suppressor audio output 109 to the transceiver 150 for transmission of full duplex communication channel.

Any of the predetermined filtering or predetermined gain imposed by corresponding filters and amplifiers within the fixed pre-conditioning logic 120 is based on assumptions made about characteristics of the voice signal received by the one or more microphones 110. In other words, the fixed pre-conditioning logic 120 treats all audio signals in the same way. Because of these assumptions, inappropriate filtering or gain may be applied for certain types of audio signals having certain types of noise characteristics that deviate from the assumed characteristics. Further, because of possible inappropriate filtering or application of inappropriate gain, the echo canceller 130 and the noise suppressor 140 may not operate under optimum conditions due to an erroneous input signal received from the fixed pre-conditioning logic 120.

Therefore in accordance with the embodiments, the dynamic pre-conditioning logic 200 monitors the audio signal 101 received from the one or more microphones 110 and, based on signal analysis, makes decisions regarding appropriate pre-conditioning filtering or pre-conditioning amplification gain for the specific audio signal accordingly. This dynamic pre-conditioning results in better noise suppression by the noise suppressor 140. That is, the echo canceller audio signal output 105, which is provided as an input to noise suppressor 140, will be more realistic because it is pre-conditioned based on at least one characteristic of the audio signal 101 detected by the dynamic pre-conditioning logic 200. The dynamic pre-conditioning logic 200 monitors the echo canceller audio signal output 105 as feedback signal 107 and analyzes it to obtain at least one characteristic of the feedback signal 107. Based on this analysis, and on the at least one characteristic, the dynamic pre-conditioning logic 200 makes decisions regarding application of filtering or gain.

In some embodiments, the fixed preconditioning 120 can be disabled such that any pre-conditioning on the send path is only performed by the dynamic pre-conditioning logic 200. The dynamic pre-conditioning logic 200 is "dynamic" because it monitors the audio signal 101 and adjusts the audio signal 101 as environmental or other noise causing conditions (such as, but not limited to, apparatus 100 orientation etc.) create changes in the audio signal 101. Put another way, the dynamic pre-conditioning logic 200 applies appropriate filtering and/or gain to accommodate such changing audio environment conditions.

Figure 2:
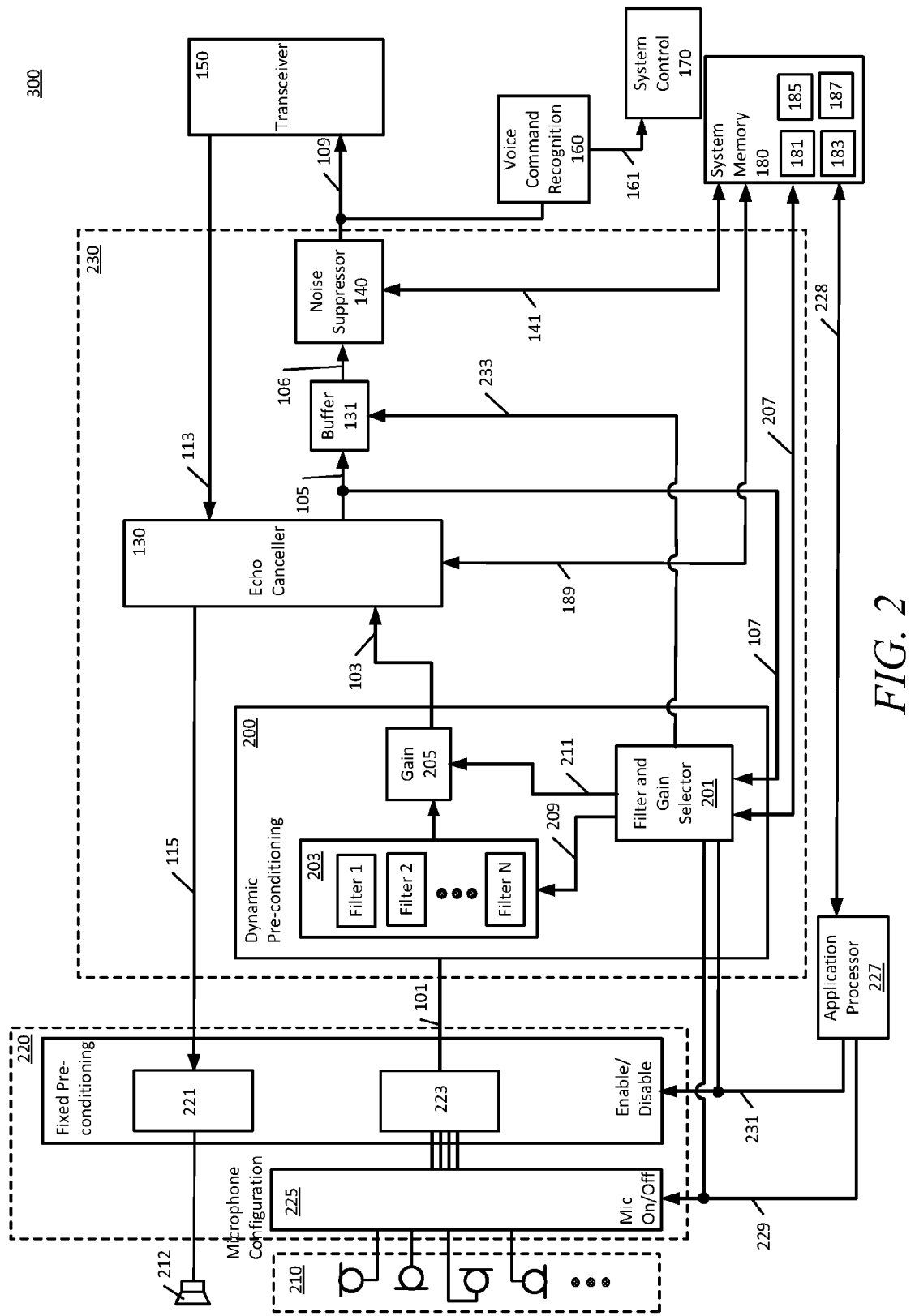
FIG. 2 is a schematic block diagram showing further details of an apparatus with dynamic audio signal pre-conditioning logic in accordance with the embodiments.

FIG. 2 is a schematic block diagram of an example apparatus 300 and shows further details of dynamic pre-conditioning logic 200 in accordance with the embodiments. Similar to the apparatus 100 illustrated in FIG. 1, the apparatus 300 may be any of various communication devices such as, but not limited to, a stationary telephone, cordless telephone, mobile phone, smart phone, tablet, laptop, etc., that may include, audio processing for voice communications, or to drive voice recognition systems to provide hands free voice control of the device.

In the example apparatus 300 shown in FIG. 2, a fixed pre-conditioning unit 220 includes fixed pre-conditioning logic along with microphone configuration logic 225. The fixed preconditioning unit 220 may be a commercially available hardware codec and/or may be implemented as a programmable processor, an ASIC, a DSP, an FPGA, or in some other suitable manner, etc. The microphone configuration logic 225 is operatively coupled to the group of microphones 210 to receive audio signal inputs and is operatively coupled to send path fixed pre-conditioning logic 223. The microphone configuration logic 225 includes a microphone on-off control input that may receive a control signal 229 to turn one or more of the microphones on or off under certain conditions. For example, an application processor 227 may be operatively coupled to the fixed pre-conditioning unit 220 and may be operative to run various applications 185 from system memory 180. Any of the various applications 185 may be operative to send the control signal 229 to the microphone configuration logic 225 and configure the group of microphones 210 as needed by the application such as, for example, for speakerphone operation, handheld operation, etc., or for some other purpose. Likewise the application processor 227 may send the control signal 231 to the enable/disable input of the fixed preconditioning logic to enable or disable it under certain conditions. Alternatively, in the various embodiments, the fixed pre-conditioning logic may be disabled such that the dynamic pre-conditioning logic 200 may replace it completely. The dynamic pre-conditioning logic 200 may include filter and gain selector 201 which may also be operative to send control signal 229 and/or control signal 231 to the fixed pre-conditioning unit 220.

In accordance with the embodiments, fixed pre-conditioning logic 223 for the send path is operatively coupled to the dynamic pre-conditioning logic 200 and provides an audio signal 101. The dynamic pre-conditioning logic 200 is operatively coupled to the echo canceller 130 to provide a pre-conditioned audio signal as echo canceller audio signal input 103, and to receive an echo canceller audio signal output 105 as a feedback signal 107. The echo canceller 130 is operatively coupled to a buffer 131 to provide an echo canceller audio signal output 105 to the buffer 131. The echo canceller 130 is also operatively coupled to the transceiver 150 to obtain a received audio signal 113, and is operatively coupled to fixed pre-conditioning logic 221 for the receive path to provide an echo canceller audio signal output signal 115. The fixed pre-conditioning logic 221 for the receive path is operatively coupled to the speaker 212 to provide the output audio signal. The transceiver 150 may be a wireline transceiver or may be a wireless transceiver, or a VoIP component, in accordance with the various embodiments as mentioned previously above.

The apparatus 300 also includes a noise suppressor 140 which is operatively coupled to the buffer 131 to receive the buffer audio output signal 106 and to provide a noise suppressor audio signal output 109 to the transceiver 150 for transmission on the full-duplex communication channel. The noise suppressor audio signal output 109 may also be provided to voice command recognition logic 160. The voice command recognition logic 160 is operatively coupled to the system control 170 to provide the control signal 161.

In accordance with some embodiments, the dynamic pre-conditioning logic 200, echo canceller 130, buffer 131 and noise suppressor 140 may be implemented in an integrated manner, for example, in a single signal processing unit 230. The signal processing unit 230 may be implemented on a programmable processor, ASIC, DSP, FPGA or in some other appropriate manner. The signal processing unit 230 may also be considered to be a type of apparatus in accordance with some embodiments in that the signal processing unit 230 may be included in various other apparatuses, such as apparatus 300, to provide the advantages, features and functions described herein.

The apparatus 300 may also include a system memory 180 which is a non-volatile, non-transitory memory. The system memory 180 may store a lookup table 181, a table of noise suppression algorithms 183, one or more applications 185 and a table of echo canceller algorithms 187. The application processor 227 is operatively coupled to the system memory 180 by read/write interface 228 and may access and execute any of the various one or more applications 185. The system memory 180 is also operatively coupled to the noise suppressor 140 and the echo canceller 130. In some embodiments, the echo canceller 130 may access the system memory 180 over read/write interface 189 to access the echo canceller algorithms 187. Similarly the noise suppressor 140 may access the system memory over read/write interface 141 to access and execute noise suppression algorithms 183. In some embodiments, the signal processing unit 230 may have its own integrated memory, in addition to system memory 180, and may store the lookup table 181, noise suppression algorithms 183 or the echo canceller algorithms 187 independently and independent from the system memory 180.

In some embodiments, the dynamic pre-conditioning logic 200 includes configurable filter logic 203, amplifier or gain 205 and a filter and gain selector 201. The filter and gain selector 201 is operatively coupled to the configurable filter logic 203 and to the adjustable gain 205 and provides respective control signal 209 and control signal 211. The filter and gain selector 201 is also operatively coupled to the echo canceller 130 and receives the feedback signal 107. The filter and gain selector 201 is also operatively coupled to system memory 180 and is operative to access a lookup table 181 which contains sets of filter coefficients that may be used to configure one or more filters of the configurable filter logic 203. The audio signal 101 which is received by the dynamic pre-conditioning logic 200 is initially passed through to the echo canceller 130 as audio signal 103 which is processed by the echo canceller 130. The feedback signal 107 is then provided to the filter and gain selector 201 which performs analysis of the feedback signal 107.

The filter and gain selector 201 is operatively coupled to a buffer 131 and sends a control signal 233 to control the buffer 131 to begin buffering the echo canceller audio signal output 105. The purpose of the buffer 131 is to delay the audio signal (i.e. buffer audio output signal 106) provided to the noise suppressor 140 in order to provide time for the dynamic pre-conditioning logic 200 to make adjustments. The buffer 131 buffers the echo canceller audio signal output 105 in response to the control signal 233 from the filter and gain selector 201. That is, the filter and gain selector 201 controls the buffer 131 to buffer the echo canceller audio signal output 105 to provide a time delay such that the filter and gain selector 201 may dynamically adjust the echo canceller audio signal output 105 using configurable filter logic 203 and adjustable gain 205 prior to applying the noise suppressor 140. Therefore, under some audio environment conditions, if the filter gain and selector logic 201 determines that no filtering or gain adjustment to the audio signal is required, the buffer 131 may proceed to send the buffer audio output signal 106 to the noise suppressor 140.

However, if audio filtering is required, the filter and gain selector 201 may send control signal 233 to the buffer 131 to clear the buffer and to pass through (without buffering) the echo canceller audio signal output 105 (after application of pre-conditioning filters or gain) to the noise suppressor 140. Put another way, the buffer 131 is operative to either buffer the echo canceller audio signal output 105 or may pass through the signal with no buffering (i.e. with no added buffering delay) after pre-conditioning has been applied.

The pre-conditioning applied is based on analysis of the feedback signal 107. That is, the filter and gain selector 201 analyzes the feedback signal 107 and determines at least one characteristic of the feedback signal 107. Based on the characteristic, the filter and gain selector 201 accesses the lookup table 181 over read/write interface 207 and selects a set of filter coefficients for one or more filters corresponding to the characteristics observed in the feedback signal 107. The observed characteristics may include voice or noise information obtained from the echo canceller 130 output as the feedback signal 107 such as, but not limited to energy, spectral content, phonetic content, frequency range, noise type, noise level, amplitude, etc. that may be used in the decision making process. The filter and gain selector 201 also determines what if any filters of the configurable filter logic 203 will be applied to the audio signal 101 based on the observed characteristic.

Figure 3:
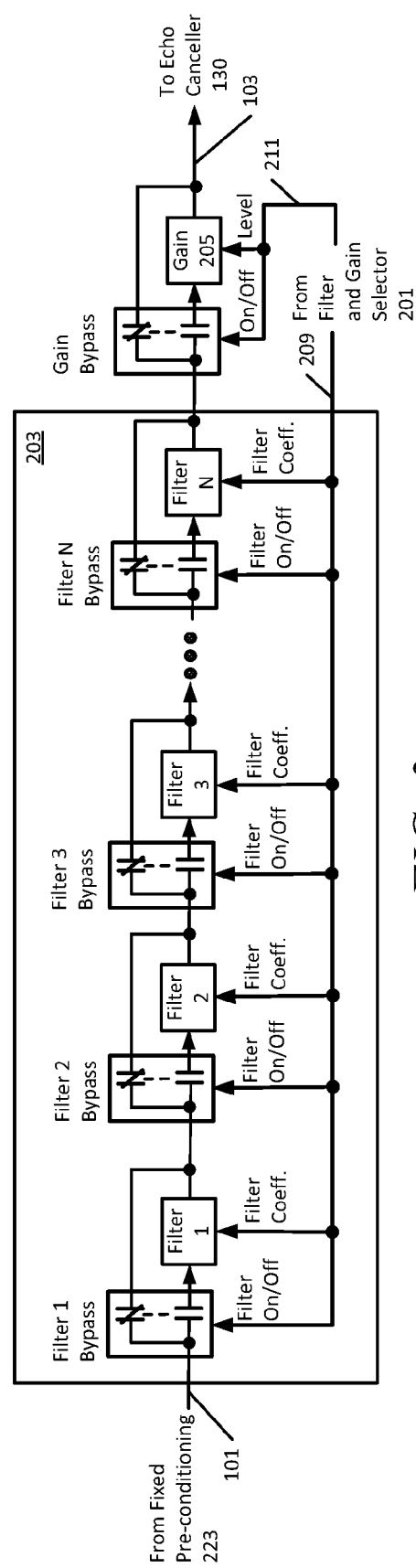
FIG. 3 is a schematic block diagram of filter logic that may implemented in conjunction with the dynamic pre-conditioning logic shown if FIG. 2 in accordance with some embodiments.

Turning to FIG. 3, details of one example of the configurable filter logic 203 are provided. The configurable filter logic 203 receives the audio signal 101 from the fixed pre-conditioning logic 223 for the send path. Based on the control signal 209 received from the filter and gain selector 201, one or more of the various filters (filter 1 through filter "N") will be turned on by controlling appropriate filter bypass switch logic (filter 1 bypass through filter "N" bypass). The filter bypass switch logic may be implemented in any appropriate manners including, but not limited to, using tri-state logic, or some other appropriate logic or software or firmware, etc. By selecting appropriate filter bypass switch logic a sequential series of filters may be configured. Each filter of filter 1 through filter N is a predetermined filter that has predetermined characteristics such as, but not limited to, a high pass filter characteristic, a bandpass filter characteristic, frequency pre-emphasis, or some other predetermined filter characteristic that may be selected and applied to the audio signal 101 as deemed necessary. Some filters may be adjusted by control signal 209 by changing filter coefficients where the filter coefficients are selected from the lookup table 181 stored in system memory 180.

Therefore the configurable filter logic 203 may consist of a plurality of filters such as filter 1 through filter N which are selectable to configure a series of filters. Further, the individual filters are configurable by adjusting the filter's coefficients. The configurable filter logic 203 is operatively coupled to the adjustable gain 205 (i.e. amplification). The adjustable gain 205 also has gain bypass switch logic that is controllable by control signal 211 to bypass the gain 205. The pre-conditioned audio signal is thus provided as an echo canceller audio signal input 103 as shown. The control signal 211 also controls the gain level of adjustable gain 205. The control signal 209 from the filter and gain selector 201 therefore can switch any of the filters on or off by controlling the appropriate filter bypass switch logic. In one example, filter 1 and filter 3 may be configured to operate in series while filter 2 and filter 4 through filter "N" are turned off (i.e. bypassed) in accordance with the control signal 209. If the adjustable gain 205 is switched on (i.e. not bypassed), then the control signal 211 may control the gain 205 to provide the appropriate level of gain.

In one example, an FFT may be performed and the results may have one or more characteristics that match known characteristics in the lookup table 181 that indicate the presence of stationary noise. In this situation, the configurable filter logic 203 may be configured to provide high pass and frequency specific filters. If the FFT results have one or more characteristics that match known characteristics in the lookup table 181 that indicate the presence of non-stationary noise, then frequency specific filters may be applied. For example, filters that emphasize the frequency spectrum in the 1 KHz to 2 KHz range may be applied. In some embodiments, the filter and gain selector 201 may also determine the type of echo cancellation that is being applied and make adjustments based on the specific type of echo cancellation.

Returning to FIG. 2, the filter and gain selector 201 is therefore operative to send a control signal 209 to the configurable filter logic 203 to configure a series of filters as appropriate for the audio signal 101, based on analysis of the feedback signal 107. The filter and gain selector 201 is also operative to send the control signal 211 to the adjustable gain 205 to provide an appropriate level of gain adjustment. The dynamic pre-conditioning logic 200 then provides the pre-conditioned audio signal as an echo canceller audio signal input 103 to the echo canceller 130. At that point, the buffer 131 may provide the buffer audio output signal 106 to the noise suppressor 140.

The noise suppressor 140 may access the system memory 180 over read/write interface 141 and select an appropriate noise suppression algorithm from the noise suppression algorithms 183. The noise suppressor audio signal output 109 is provided to the transceiver 150 for transmission on the full-duplex communication channel.

In some embodiments, the filter and gain selector 201 is operative to send the control signal 231 to enable or disable the send path fixed pre-conditioning logic 223 and may also be operative to send control signal 229 to the microphone configuration logic 225 to turn microphones on or off. In other embodiments, the send path fixed pre-conditioning logic 223 may continue to operate in conjunction with the dynamic pre-conditioning logic 200. In this scenario, the dynamic pre-conditioning logic 200 may operate together with the fixed pre-conditioning logic 223 or may be operative to disable all, or portions, of the fixed pre-conditioning logic as needed.

On a receive path of the apparatus 300, the transceiver 150 provides received voice as received audio signal 113 to the echo canceller 130, which in turn provides the echo canceller audio output signal 115 to the receive path fixed pre-conditioning logic 221 for further provision to the speaker 212.

Figure 4:
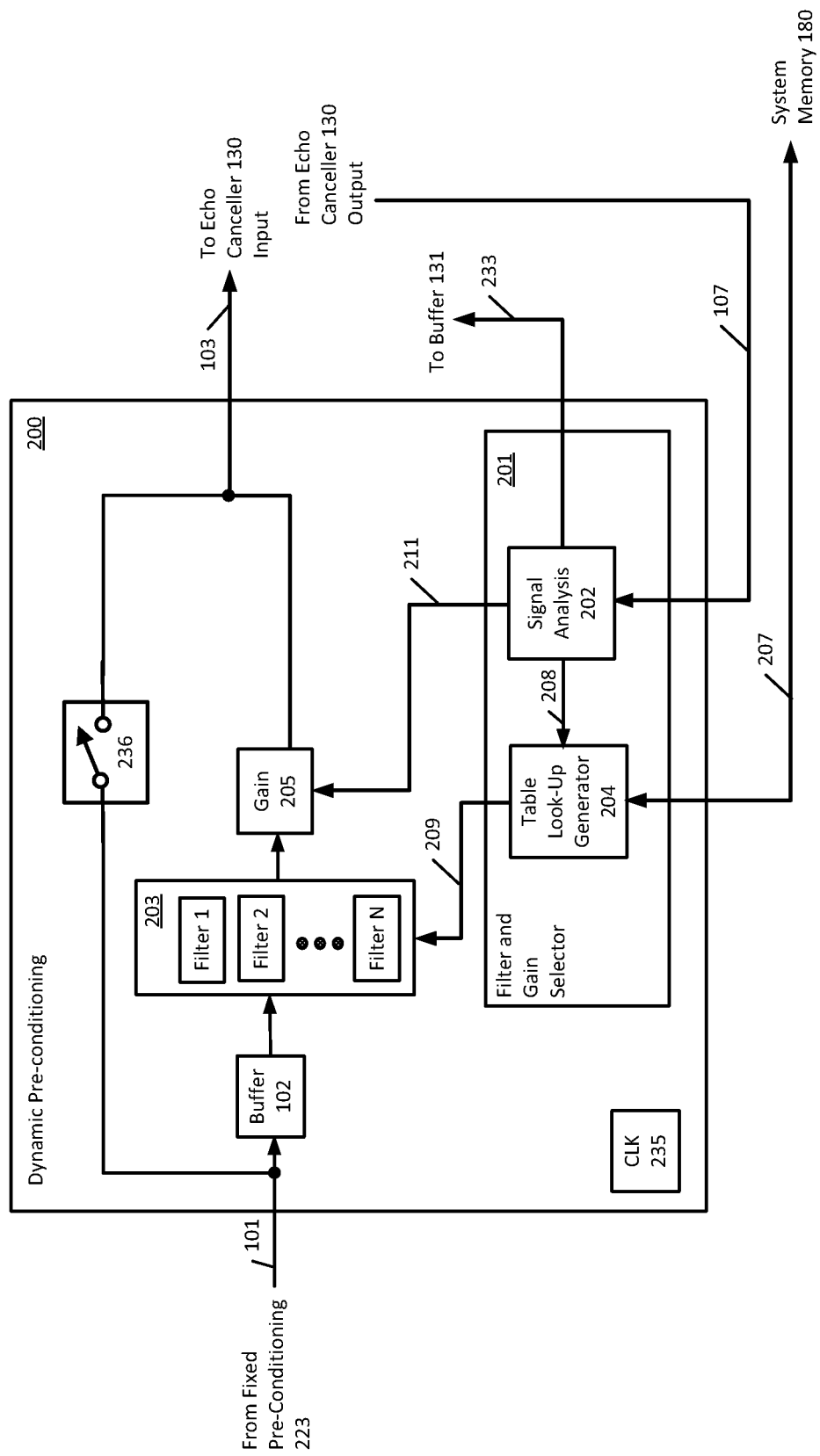
FIG. 4 is a schematic block diagram showing further details of dynamic audio signal processing logic and a filter and gain selector in accordance with some embodiments.

FIG. 4 provides further example details of the dynamic pre-conditioning logic 200 and the filter and gain selector 201. As shown in FIG. 4, the filter and gain selector 201 may include a signal analysis logic 202 which is operatively coupled to a table lookup generator 204. The signal analysis logic 202 receives the feedback signal 107 from the echo canceller 130 and performs signal analysis such as, but not limited to, frequency domain analysis and level analysis. In one example embodiment, the signal analysis logic 202 includes an FFT block with x number of points and operating at 8 Khz or 16 Khz and that performs frequency domain analysis on the feedback signal 107. The signal analysis logic 202 obtains at least one characteristic observed from the feedback signal 107 such as an observed frequency range, signal amplitude (level), and may also use an observed frequency spectral characteristic to discern noise contained in the signal. For example, the signal analysis 202 may determine that stationary or non-stationary type noise is contaminating the audio signal. Based on the analysis and at least one characteristic of the feedback signal 107 obtained from the analysis, the signal analysis logic 202 sends control signal 208 to the table lookup generator 204. In response to receiving the control signal 208, which includes information regarding at least one characteristic of the feedback signal 107, the table lookup generator 204 accesses the system memory 180, over the read/write interface 207, and accesses the lookup table 181 to determine appropriate filter coefficients. The table lookup generator then provides the control signal 209 to the configurable filter logic 203 to select and configure one or more filters.

The signal analysis logic 202 therefore, in some embodiments, may include an FFT (or another frequency domain analysis or some other analysis logic) and level analysis logic which determines whether filtering and/or gain needs to be applied. Based on level analysis the signal analysis logic 202 may provide the control signal 211 to the adjustable gain 205 to adjust the gain/amplification level accordingly. The signal analysis logic 202 also provides the control signal 233 to the buffer 131 to control the buffer 131 to begin buffering the echo canceller audio signal output 105 so that, if no pre-conditioning is required, the buffer audio output signal 106 may be provided to the noise suppressor 140.

The operation of the dynamic pre-conditioning logic 200 may be driven by a clock 235 which may receive input from a system clock (not shown) of the apparatus 300 in some embodiments. All components of the dynamic pre-conditioning logic 200 are operatively coupled to the clock 235 however these inputs are not shown for clarity. The dynamic pre-conditioning logic 200 includes buffer 102 which buffers audio frames according to a clock signal from clock 235. The audio frames are received as the audio signal 101 which is provided by one or more ADCs of the fixed pre-conditioning unit 220. For each audio frame, switch logic 236 is closed, in accordance with the clock signal from clock 235, for a length of time long enough to pass the audio frame to the echo canceller 130 so that the echo canceller may initially process the audio frame. Buffer 131 shown in FIG. 2 will buffer the echo canceller audio signal output 105 for a period of time long enough for the dynamic pre-conditioning logic 200 to either determine that no pre-conditioning is needed, or to determine that pre-conditioning is needed and apply filtering and/or gain accordingly. The buffer 102 delays the audio frame for a period of time long enough for the echo canceller 130 to process the audio frame, and provide the feedback signal to the signal analysis logic 202. The buffer 102 also provides time for the signal analysis logic 202 to perform frequency domain (such as FFT) and level analysis, and for the table look-up generator 204 to obtain filter coefficients from lookup table 181 and configure the configurable filter logic 203. The buffer 102 then passes the audio frame to the filter logic 203 and subsequent adjustable gain 205 which is applied if needed. The pre-conditioned audio signal is then provided as echo canceller audio signal input 103 to the echo canceller 130. The signal analysis logic 202 may also send control signal 233 to buffer 131 to clear the buffer 131 and to control the buffer 131 to pass through the adjusted audio frame from the echo canceller 130 to the noise suppressor 140. In other words, an optimized audio signal is provided to the noise suppressor 140.

Because the allowable processing time on the send path determines the number of filter stages that may be applied to the audio signal, in some embodiments, the filter and gain selector 201 determines the allowable number of filters, from the configurable filter logic 203, that can be applied while still maintaining an allotted processing time. That is, if the processing time is not sufficient for all filtering that would be useful to apply to the audio frame, the filter and gain selector 201 will prioritize the applied filters and apply only those that have the most impact on audio signal improvement. For example, noise filtering may be prioritized over emphasis filters or vice versa. Also, the filter and gain selector 201 may apply additional filters to "fill-up" any available processing time if such additional filters would further improve the audio signal.

Figure 5:
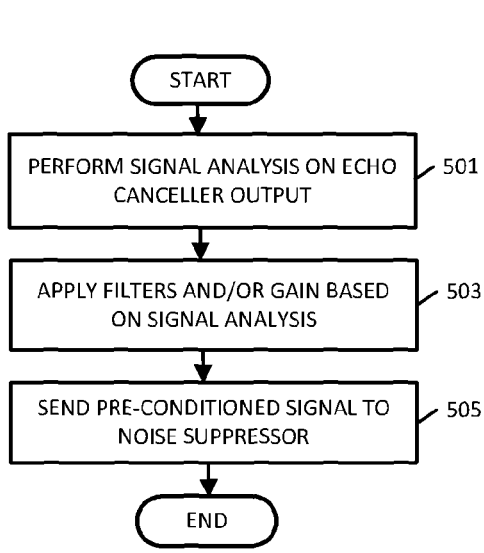
FIG. 5 is a flow chart showing a method of operation of dynamic audio signal pre-conditioning in accordance with various embodiments.

The flowchart of FIG. 5 illustrates one method of operation in accordance with the embodiments. In operation block 501, an apparatus performs signal analysis on an echo canceller output. In operation block 503 the apparatus applies filters and/or gain based on the signal analysis. In operation block 505, the apparatus sends the pre-conditioned audio signal to a noise suppressor. The method of operation then ends.

Figure 6:
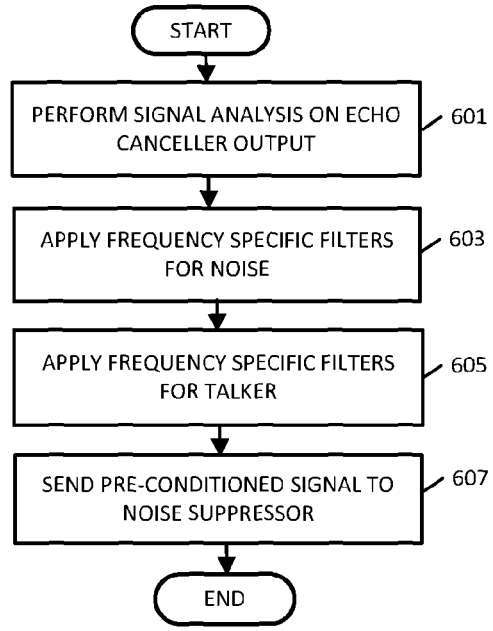
FIG. 6 is a flow chart showing a method of operation of dynamic audio signal pre-conditioning in accordance with various embodiments.

The flowchart of FIG. 6 illustrates another method of operation. The method of operation begins in operation block 601, and the dynamic pre-conditioning logic 200 performs signal analysis on the echo canceller 130 output. In operation block 603, the dynamic pre-conditioning logic 200 applies frequency specific filters for noise as determined by the filter and gain selector 201. In operation block 605, the dynamic pre-conditioning logic 200 applies frequency specific filters to filter a talker's voice and, in operation block 607, the dynamic pre-conditioning logic 200 sends a preconditioned audio signal to the noise suppressor 140. The method of operation then ends.

Figure 7:
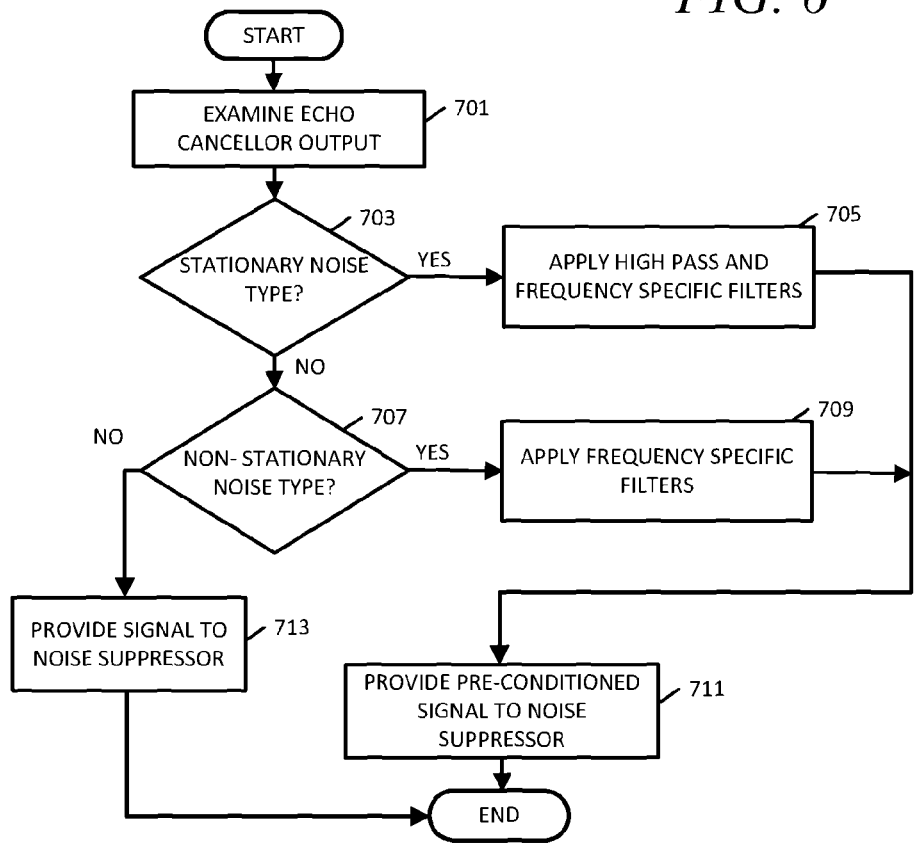
FIG. 7 is a flow chart showing a method of operation of a dynamic audio signal pre-conditioning in accordance with various embodiments.

FIG. 7 illustrates another method of operation of the dynamic preconditioning logic 200 which may include the signal analysis logic 202 and the table lookup generator 204. The method of operation begins and in operation block 701, the signal analysis logic 202 examines the echo canceller output and performs signal analysis. Based on the signal analysis such, as but not limited to, frequency domain analysis, the signal analysis logic 202 may determine in decision block 703 whether stationary noise is present in the audio signal. If, in decision block 703, the signal analysis logic 202 determines that a stationary noise type is present, then the table lookup generator 204 will send an appropriate control signal 209 to the configurable filter logic 203 to apply a high pass filter, and possibly other frequency specific filters, as shown in operation block 705. If a stationary noise type is not determined to be present in decision block 703, then the signal analysis logic 202 will look for non-stationary noise types as shown in decision block 707. If, in decision block 707, a non-stationary noise type is determined to be present in the audio signal, then the table lookup generator 204 will send an appropriate control signal 209 to the configurable filter logic 203 to apply frequency specific filters as shown in operation block 709. Subsequent to either of operation blocks 705 or 709, the method of operation proceeds to operation block 711 in which the pre-conditioned audio signal is provided to the noise suppressor. The method of operation then ends. However, if a non-stationary noise type is not determined to be present in decision block 707, then the audio signal without any pre-conditioning may be provided to the noise suppressor as shown in operation block 713 and the method of operation then ends.

Figure 8:
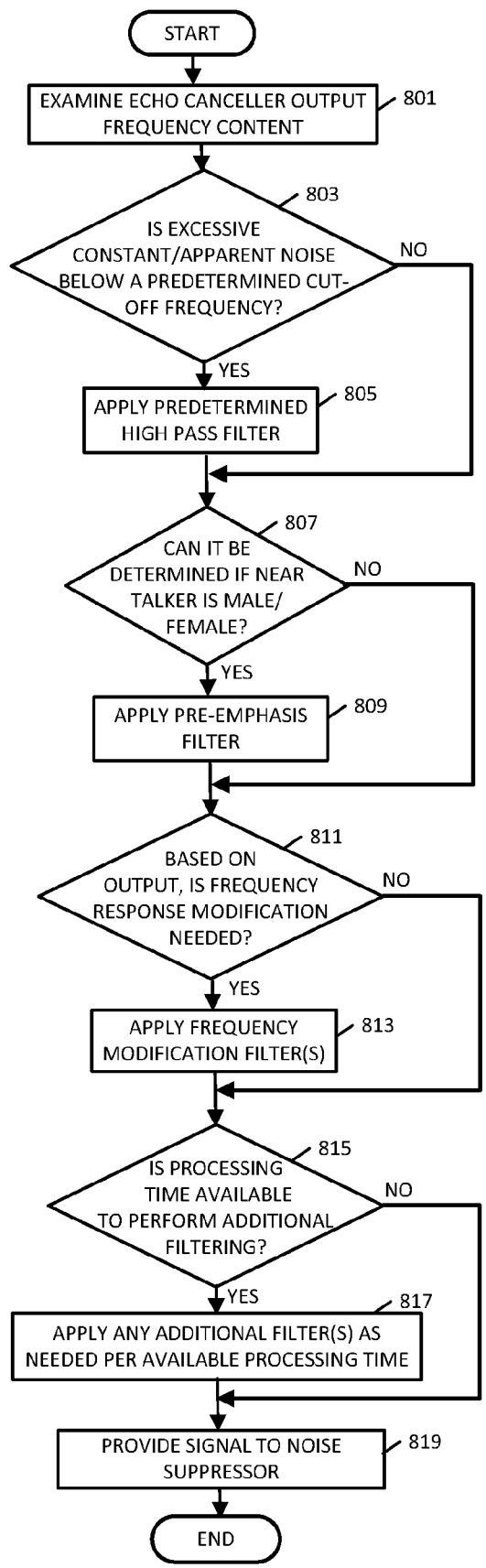
FIG. 8 is a flow chart showing a method of operation of dynamic audio signal pre-conditioning in accordance with various embodiments.

The flowchart of FIG. 8 provides details of a method of operation of the filter and gain selector 201 and the configurable filter logic 203. The method of operation begins and, in operation block 801, the filter and gain selector 201 examines the echo canceller output for its frequency content. For example, the signal analysis logic 202 of the filter and gain selector 201 may perform an FFT or some other frequency domain analysis on the echo canceller output (i.e. feedback signal 107) to determine the frequency content. In decision block 803, the signal analysis logic 202 determines if excessive constant/apparent noise is below a predetermined cutoff frequency. If yes, then the signal analysis logic 202 sends the control signal 208 to the table lookup generator 204. The table lookup generator 204 sends the control signal 209 to the configurable filter logic 203 to apply a predetermined high pass filter as shown in operation block 805. If no, in decision block 803, then the method of operation proceeds to decision block 807. The signal analysis logic 202 may determine if a near talker (i.e. a talker near to one or more of the microphones 210) is male or female in some embodiments, by determining whether the talker's voice is within a given known frequency range. If not, then the method of operation proceeds to decision block 811. If the near talker's voice is determined to be within a given known frequency range in decision block 807, then the appropriate control signal 209 is sent to the configurable filter logic 203 to apply appropriate pre-emphasis filters as shown in operation block 809.

In decision block 811, the signal analysis logic 202 determines, based on the feedback signal 107, if frequency response modification is needed. If not, then the method of operation proceeds to decision block 815. If yes, then the appropriate control signal is sent to the configurable filter logic 203 to apply a frequency modification filter or filters as needed as shown in operation block 813. In decision block 815, the signal analysis logic 202 may also determine the processing time available to perform additional filtering or to perform the filtering described in the FIG. 8 flowchart above. In other words, the echo canceller audio signal output 105 that is buffered by the buffer 131 may only delay the audio frame by a certain period of time. That is, the full-duplex communication channel must process and send out audio frames on a schedule for apparatus 300 such that the user experience of a real-time conversation is maintained. Therefore, based on the processing time available as determined in decision block 815, the signal analysis logic 202 may determine that additional filtering may be applied as needed as shown in operation block 817. Otherwise operation block 817 is bypassed and the buffer audio output signal 106 is provided as a pass through to the noise suppressor 140, as shown in operation block 819, and the method of operation ends.

Therefore among other advantages of the various embodiments, the noise suppression applied by noise suppressor 140 is improved because the audio signal input to the noise suppressor 140 is enhanced by the dynamic pre-conditioning logic 200 prior to applying noise suppression algorithms. The fixed pre-conditioning which would otherwise be applied by the send path fixed pre-conditioning logic 223 may be disabled However, as mentioned above, the fixed pre-conditioning logic 223 may still be used in some embodiments depending on the granularity of its controllability. For example, if pre-determined filters of the fixed preconditioning logic 223 may be individually enabled and disabled, or if amplifier gains may be individually adjusted, then the filter and gain selector 201 may directly control enabling and disabling of such fixed pre-conditioning filters and/or gain via the control signal 231. However in other embodiments the fixed preconditioning logic 223 is globally disabled such that no features operate while the dynamic preconditioning logic 200 is operational (other than necessary ADCs, DACs, etc. that may be included in the fixed pre-conditioning unit 220).

It is to be understood that the various schematic block diagrams provided in FIG. 1 through FIG. 4 are limited to showing only those components useful to describe the features and advantages of the various embodiments, and to describe how to make and use the various embodiments to those of ordinary skill. It is therefore to be understood that various other components, circuitry, and devices etc. may be present in order to implement a an apparatus and that those various other components, circuitry, devices, etc., are understood to be present by those of ordinary skill. For example, one of ordinary skill will understand that a power source, such as a battery, will be present in the various apparatuses. In another example, one of ordinary skill will understand that the transceiver 150 may provide various processing such as, but not limited to, interleaving, channelization, control, etc.

The various components, circuitry, devices etc. described with respect to the figures including, but not limited to, those described using the term "logic" such as, but not limited to the dynamic pre-conditioning logic 200, echo canceller 130, noise suppressor 140, buffers, switch logic, etc., and/or the fixed pre-conditioning unit 220 or signal processing unit 230, etc., may be implemented in various ways such as by software and/or firmware executing on one or more programmable processors such as a central processing unit (CPU) or the like, or by ASICs, DSPs, FPGAs, hardwired circuitry (logic circuitry), or the like, or by any combinations thereof. In one example, the signal processing unit 230 may be implemented as an ASIC, a DSP, and FPGA or a programmable processor executing executable instructions that implement the methods of operation herein described. In another example, the dynamic pre-conditioning logic 200 may be implemented using an FPGA that interfaces with another FPGA that includes the echo canceller, noise suppressor, etc. Other examples that may occur to those of ordinary skill are contemplated by the examples and disclosure provided herein.

The terminology "operatively coupled" as used herein refers to coupling that enables operational and/or functional communication and relationships between the various components, circuitry, devices etc. described as being operatively coupled and may include any intervening items (i.e. buses, connectors, other components, circuitry, devices etc.) that may be present to enable such communication such as, for example, data communication buses or any other intervening items that one of ordinary skill would understand to be present. Also, it is to be understood that other intervening items may be present between "operatively coupled" items even though such other intervening items are not necessary to the functional communication facilitated by the operative coupling. For example, a data communication bus may be present in various embodiments and may provide data to several items along a pathway along which two or more items are operatively coupled, etc. Such operative coupling is shown generally in FIG. 1 through FIG. 4 described herein.

It is to be understood that the various "control signals" described herein with respect to various components such as, but not limited to, the dynamic pre-conditioning logic 200, filter and gain selector 201, various switch logic, fixed pre-conditioning unit 220, etc., may be implemented in various ways such as using application programming interfaces (APIs) between the various components. Additionally, operations involving the lookup table 181 may be implemented using pointers where the components access the lookup table 181 as directed by the filter and gain selector 201 in some embodiments. In other words, control signal 209 and control signal 211 may be implemented such that the configurable filter logic 203 and adjustable gain 205 obtain control information such as, but not limited to, filter coefficients, gain values, etc., from the lookup table 181 stored in system memory 180 and that such implementations are contemplated embodiments and are in accordance with the various embodiments and examples described herein.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A computer-implemented method comprising:
   receiving, by a dynamic pre-conditioning module that is communicatively coupled between a fixed pre-conditioning module and an echo cancelling module in a send path of a mobile communications device, an input audio signal from the fixed pre-conditioning module;
   preconditioning, by the dynamic pre-conditioning module, the initial input audio based on one or more initial preconditioning parameters;
   providing, by the dynamic pre-conditioning module, the preconditioned, initial input audio signal to the echo cancelling module;
   receiving, by the dynamic pre-conditioning module, a subsequent input audio signal from the fixed pre-conditioning module;
   receiving, by the dynamic pre-conditioning module, a feedback signal from the echo cancelling module to which the pre-conditioned, initial audio signal was provided;
   determining, by the dynamic pre-conditioning module, one or more characteristics of the feedback signal from the echo cancelling module to which the preconditioned, initial audio signal was provided;
   selecting, by the dynamic pre-conditioning module, one or more adjusted pre-conditioning parameters based on the one or more characteristics of the feedback signal;
   pre-conditioning, by the dynamic pre-conditioning module, the subsequent input audio signal based on the one or more adjusted preconditioning parameters; and
   providing, by the dynamic pre-conditioning module, the pre-conditioned, subsequent input audio signal to the echo cancelling module.

2. The method of claim 1, comprising:
   providing a pre-conditioned echo cancelling audio signal output, based on the pre-conditioned, subsequent input audio signal, as a noise suppressor input; and
   performing noise suppression on the noise suppressor input.

3. The method of claim 1, wherein determining one or more characteristics of the feedback signal comprises:
   determining one or more frequency or amplitude characteristics of the feedback signal.

4. The method of claim 1, wherein determining one or more characteristics of the feedback signal comprises:
   performing a Fast Fourier Transform (FFT) on the feedback signal.

5. The method of claim 4, wherein determining one or more characteristics of the feedback signal comprises:
   determining whether noise contained in the feedback signal is below a cutoff frequency; or determining whether a near talker's voice contained in the feedback signal is within a given frequency range.

6. The method of claim 4, comprising:
determining processing time available to perform filtering of the audio signal; and
selecting audio signal filters based on the processing time available.

7. The method of claim 1, comprising:
disabling fixed pre-conditioner filtering, prior to pre-conditioning the subsequent input audio signal.

8. A system comprising:
one or more computers and one or more storage devices storing instructions that are operable, when executed by the one or more computers, to cause the one or more computers to perform operations comprising:
receiving, by a dynamic pre-conditioning module that is communicatively coupled between a fixed pre-conditioning module and an echo cancelling module in a send path of a mobile communications device, an input audio signal from the fixed pre-conditioning module;
preconditioning, by the dynamic pre-conditioning module, the initial input audio signal based on one or more initial pre-conditioning parameters;
providing, by the dynamic pre-conditioning module, the preconditioned, initial input audio signal to the echo cancelling module;
receiving, by the dynamic pre-conditioning module, a subsequent input audio signal from the fixed pre-conditioning module;
receiving, by the dynamic pre-conditioning module, a feedback signal from the echo cancelling module to which the pre-conditioned, initial audio signal was provided;
determining, by the dynamic pre-conditioning module, one or more characteristics of the feedback signal from the echo cancelling module to which the preconditioned, initial audio signal was provided;
selecting, by the dynamic pre-conditioning module, one or more adjusted pre-conditioning parameters based on the one or more characteristics of the feedback signal;
pre-conditioning, by the dynamic pre-conditioning module, the subsequent input audio signal based on the one or more adjusted preconditioning parameters; and
providing, by the dynamic pre-conditioning module, the pre-conditioned, subsequent input audio signal to the echo cancelling module.

9. The system of claim 8, wherein the operations further comprise:
providing a pre-conditioned echo cancelling audio signal output, based on the pre-conditioned, subsequent input audio signal, as a noise suppressor input; and
performing noise suppression on the noise suppressor input.

10. The system of claim 8, wherein determining one or more characteristics of the feedback signal comprises:
determining one or more frequency or amplitude characteristics of the feedback signal.

11. The system of claim 8, wherein determining one or more characteristics of the feedback signal comprises:
performing a Fast Fourier Transform (FFT) on the feedback signal.

12. The system of claim 11, wherein determining one or more characteristics of the feedback signal comprises:

determining whether noise contained in the feedback signal is below a cutoff frequency; or
determining whether a near talker's voice contained in the feedback signal is within a given frequency range.

13. The system of claim 11, wherein the operations further comprise:
determining processing time available to perform filtering of the audio signal; and
selecting audio signal filters based on the processing time available.

14. The system of claim 8, wherein the operations further comprise:
disabling fixed pre-conditioner filtering, prior to pre-conditioning the subsequent input audio signal.

15. A non-transitory computer-readable medium storing software comprising instructions executable by one or more computers which, upon such execution, cause the one or more computers to perform operations comprising:
receiving, by a dynamic pre-conditioning module that is communicatively coupled between a fixed pre-conditioning module and an echo cancelling module in a send path of a mobile communications device, an input audio signal from the fixed pre-conditioning module;
preconditioning, by the dynamic pre-conditioning module, the initial input audio signal based on one or more initial pre-conditioning parameters;
providing, by the dynamic pre-conditioning module, the preconditioned, initial input audio signal to the echo cancelling module;
receiving, by the dynamic pre-conditioning module, a subsequent input audio signal from the fixed pre-conditioning module;
receiving, by the dynamic pre-conditioning module, a feedback signal from the echo cancelling module to which the pre-conditioned, initial audio signal was provided;
determining, by the dynamic pre-conditioning module, one or more characteristics of the feedback signal from the echo cancelling module to which the preconditioned, initial audio signal was provided;
selecting, by the dynamic pre-conditioning module, one or more adjusted pre-conditioning parameters based on the one or more characteristics of the feedback signal;
pre-conditioning, by the dynamic pre-conditioning module, the subsequent input audio signal based on the one or more adjusted preconditioning parameters; and
providing, by the dynamic pre-conditioning module, the pre-conditioned, subsequent input audio signal to the echo cancelling module.

16. The medium of claim 15, wherein the operations further comprise:
providing a pre-conditioned echo cancelling audio signal output, based on the pre-conditioned, subsequent input audio signal, as a noise suppressor input; and
performing noise suppression on the noise suppressor input.

17. The medium of claim 15, wherein determining one or more characteristics of the feedback signal comprises:
determining one or more frequency or amplitude characteristics of the feedback signal.

18. The medium of claim 15, wherein determining one or more characteristics of the feedback signal comprises:
performing a Fast Fourier Transform (FFT) on the feedback signal.

19. The medium of claim 18, wherein determining one or more characteristics of the feedback signal comprises:

determining whether noise contained in the feedback signal is below a cutoff frequency; or determining whether a near talker's voice contained in the feedback signal is within a given frequency range.

20. The system of claim 15, wherein the operations further comprise:

disabling fixed pre-conditioner filtering, prior to pre-conditioning the subsequent input audio signal.

* * * * *